J. BRADLEY.
DRILL CHUCK.
APPLICATION FILED APR. 18, 1907.

933,741.

Patented Sept. 14, 1909.

WITNESSES
G. V. Rasmussen
John A. Fehlenbeck

INVENTOR
Josiah Bradley
BY
Briesen & Knauth
ATTORNEYS

UNITED STATES PATENT OFFICE.

JOSIAH BRADLEY, OF WALTHAM, MASSACHUSETTS, ASSIGNOR TO T. R. ALMOND MANUFACTURING CO., OF BROOKLYN, NEW YORK, A CORPORATION OF NEW YORK.

DRILL-CHUCK.

933,741.

Specification of Letters Patent. Patented Sept. 14, 1909.

Application filed April 18, 1907. Serial No. 368,818.

*To all whom it may concern:*

Be it known that I, JOSIAH BRADLEY, a citizen of the United States, and a resident of Waltham, in the county of Middlesex and State of Massachusetts, have invented certain new and useful Improvements in Drill-Chucks, of which the following is a specification.

My invention relates to drill chucks, particularly of the kind in which the position of the jaws is controlled by the rotation of a key, and has for its object to provide a construction of this character in which the moving parts are well protected and efficiently located.

Figure 1:
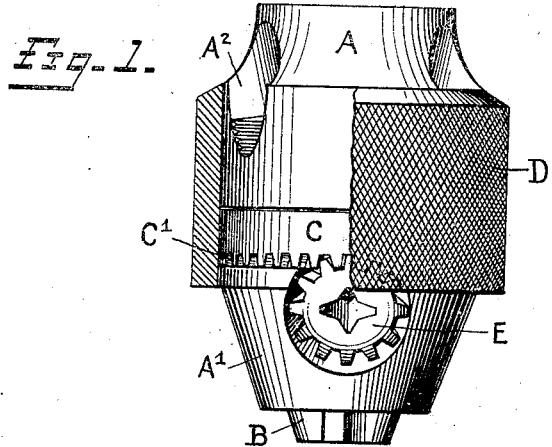
Figures 2, 3:
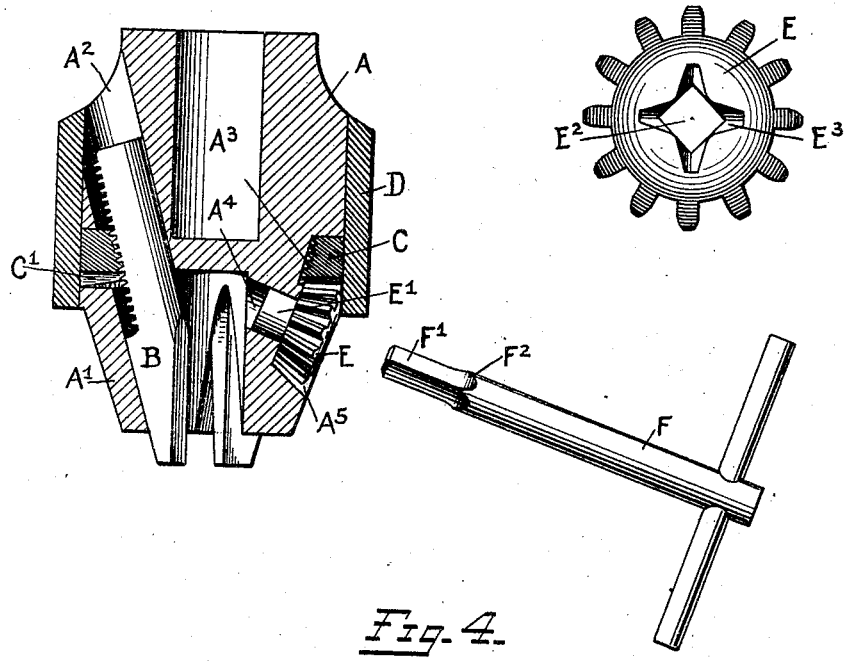
Figure 4:
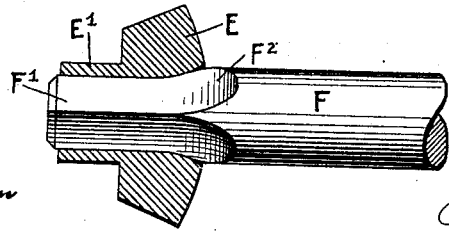

A typical embodiment of my invention is represented in the accompanying drawings, in which—Figure 1 is an elevation of the chuck, with parts broken away; Fig. 2 is a central vertical section; Fig. 3 is a detail face view of a pinion forming part of the adjusting mechanism; and Fig. 4 shows the said pinion in longitudinal section and in engagement with the operating key.

The chuck body A shown in the drawings has a conical end A' to receive the tool shank and the jaws B which move in converging slideways or jaw recesses $A^2$ and are provided with exterior screw-threads engaged by the sectional nut C contained in a groove or nut recess $A^3$ of the body A. The nut is generally made of hard steel. The nut C is a ring trapezoidal in cross section and threaded on its oblique inner surface. A ferrule D surrounds the body A and holds the nut sections together, being connected with the nut C rigidly and projecting in advance of it for a purpose to be stated hereinafter. The forward face of the nut which is the broader one of its parallel surfaces is formed with bevel teeth C', engaging those of a bevel pinion E provided with a stem E' fitting into an opening or socket $A^4$ of the body A, while the pinion E lies within a recess $A^5$. The forward edge of the ferrule D not only conceals and protects the nut C, but keeps the pinion E in position and partly shields the same. This ferrule in projecting in front of the meshing teeth of the pinion effectively obviates all danger of the workingmen's garments being caught in that portion of the apparatus as it rapidly revolves. The opening or socket $A^4$, which may communicate with the axial bore of the body in which the tool shank is received, is disposed at an acute angle to the axis of the chuck, and preferably perpendicular to the outer surface of the conical end A'.

The pinion E has a centrally located surface, generally an axial hole or recess $E^2$ of angular shape (a square recess is shown) which is adapted to receive the correspondingly formed end F' of a key F, by means of which the pinion E and nut C may be rotated to adjust the jaws B toward or from each other. In order that the inner end of the key may be kept from contact with the jaws B, I prefer to provide a suitable stop; for instance, the outer end of the recess E may be flared at the corners, as indicated at $E^3$, the key F having a corresponding flare or shoulder $F^2$.

The ferrule or sleeve D is shown as externally roughened so as to be capable of rotation by hand. In this operation the pinion E will rotate freely without affecting the mechanism of the chuck. It is obvious that the sleeve D and the nut C may, in some modifications of this structure, be integral, and, therefore, when in my claims I refer to the nut alone, I intend to be understood as including the sleeve with the nut, as well as an integral nut. It will also be seen that the upper surface of the nut C bears against the annular lower surface of the recess $A^3$. The lower edge of the nut C being serrated presents a series of depressions and projections forming teeth having separate functions; the projections retain the nut in place in the nut recess by bearing upon the lower surface of the nut recess; the depressions present bearing surfaces for engagement with the pinion. The lower surface of the nut recess is substantially annular in shape, its surface being interrupted, where the pinion engages with the teeth on the nut.

It will be seen that the key used in my invention is of very simple construction and takes up very little room. The pinion E, being a permanent part of the chuck (and not on the key) is always in perfect mesh with the nut teeth C', being held in proper position by the ferrule D, which also covers the meshing portion of the pinion and nut, and thus practically forms a gear case. Putting the gear teeth C' on the nut C is more satisfactory than placing them on the ferrule D, as the latter is generally made of softer material and therefore would be subject to greater wear.

Various modifications may be made without departing from the nature of my invention as set forth in the appended claims.

I claim:

1. The combination of the chuck body having guideways converging toward one of its ends, an axial bore to receive the tool shank, and an external socket arranged obliquely with respect to said bore, jaws arranged in said guideways, a nut for operating the jaws, provided with teeth on the side next to said socket, a pinion fitted within said socket and meshing with said nut teeth, said pinion having a key receiving surface, and a ferrule connected with said nut and projecting in front of the meshing teeth of the pinion.

2. The combination of the chuck body, the jaws, the rotatable jaw-adjusting member provided with teeth, the pinion journaled in the chuck body and meshing with said teeth, said pinion having a key-receiving surface, and the ferrule connected with said member and projecting in front of the meshing teeth of the pinion.

3. A drill chuck having a body comprising an annular outwardly opening nut recess one surface of which presents an interrupted annular surface, axially inclined jaw recesses in the body, jaws movable in the jaw recesses and having exterior threads, a nut movable in the nut recess having on one of its surfaces which is adapted to be engaged by the nut recess a regular succession of teeth, the said teeth bearing upon the annular interrupted face of the nut recess, the nut also having interior threads engaging with the threads on the jaws, a gear permanently journaled in the chuck projecting into the gap of the interrupted annular face of the nut recess and meshing with the teeth of the nut, and having means adapted to be engaged by an operating key and means for retaining the nut upon the chuck body comprising a rotatable sleeve encircling the body of the chuck connected with said nut and capable of rotation by hand, said sleeve projecting in front of the meshing teeth of the pinion but not in front of the key engaging means.

In testimony whereof, I have hereunto subscribed my name in the presence of two subscribing witnesses.

JOSIAH BRADLEY.

Witnesses:
OTTO V. SCHRENK,
JOHN A. KEHLENBECK.